Patented Oct. 23, 1934

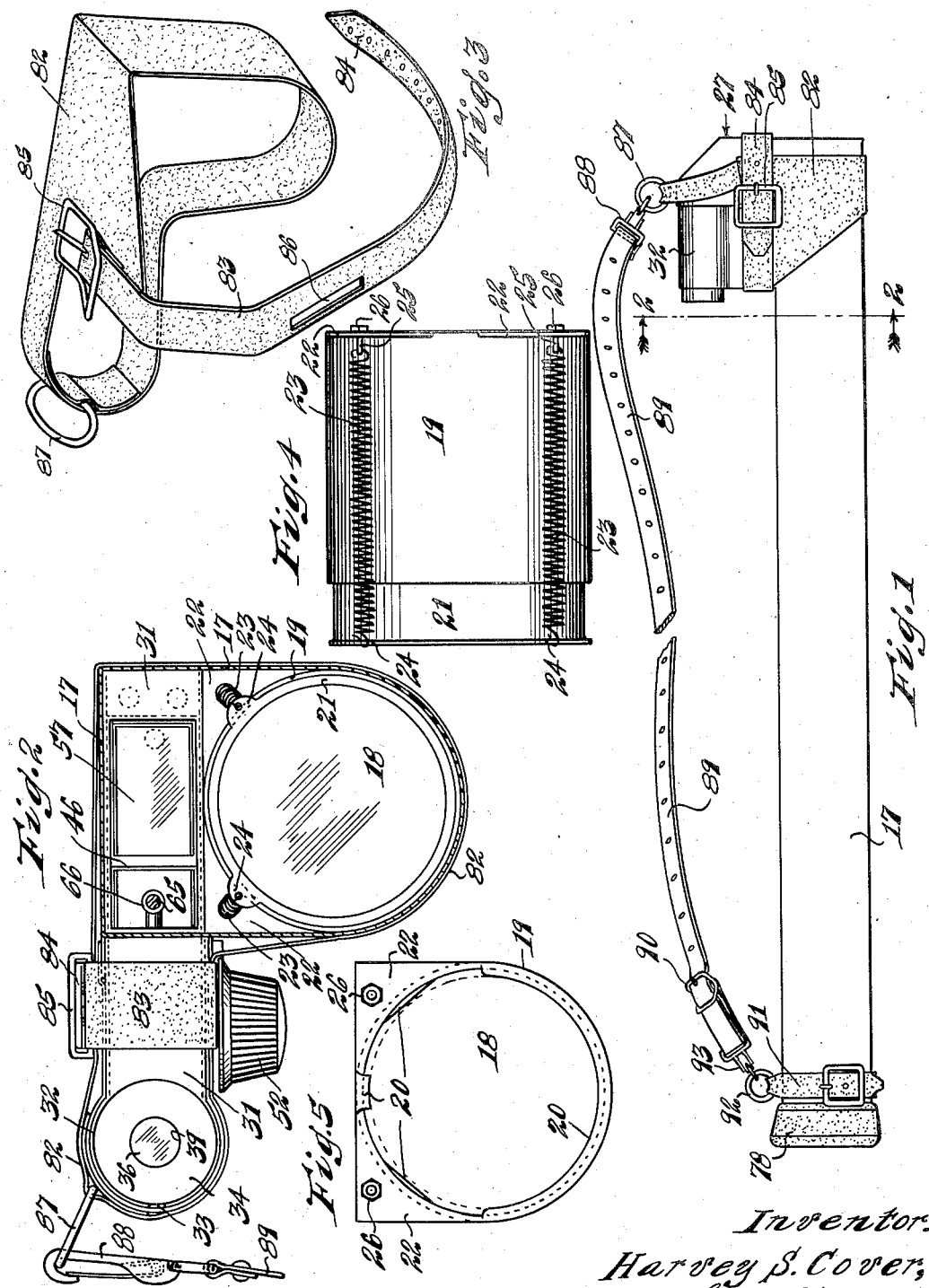

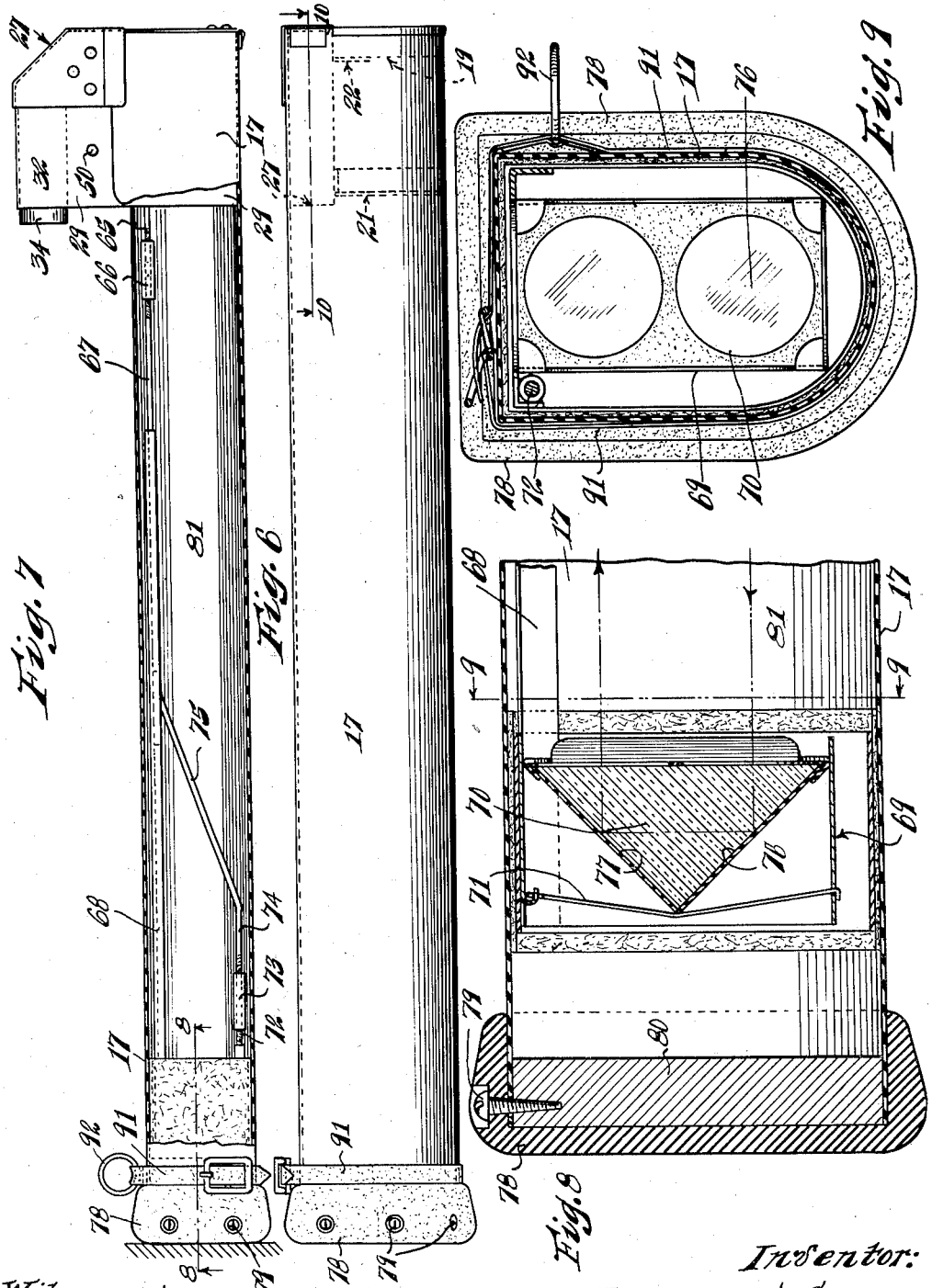

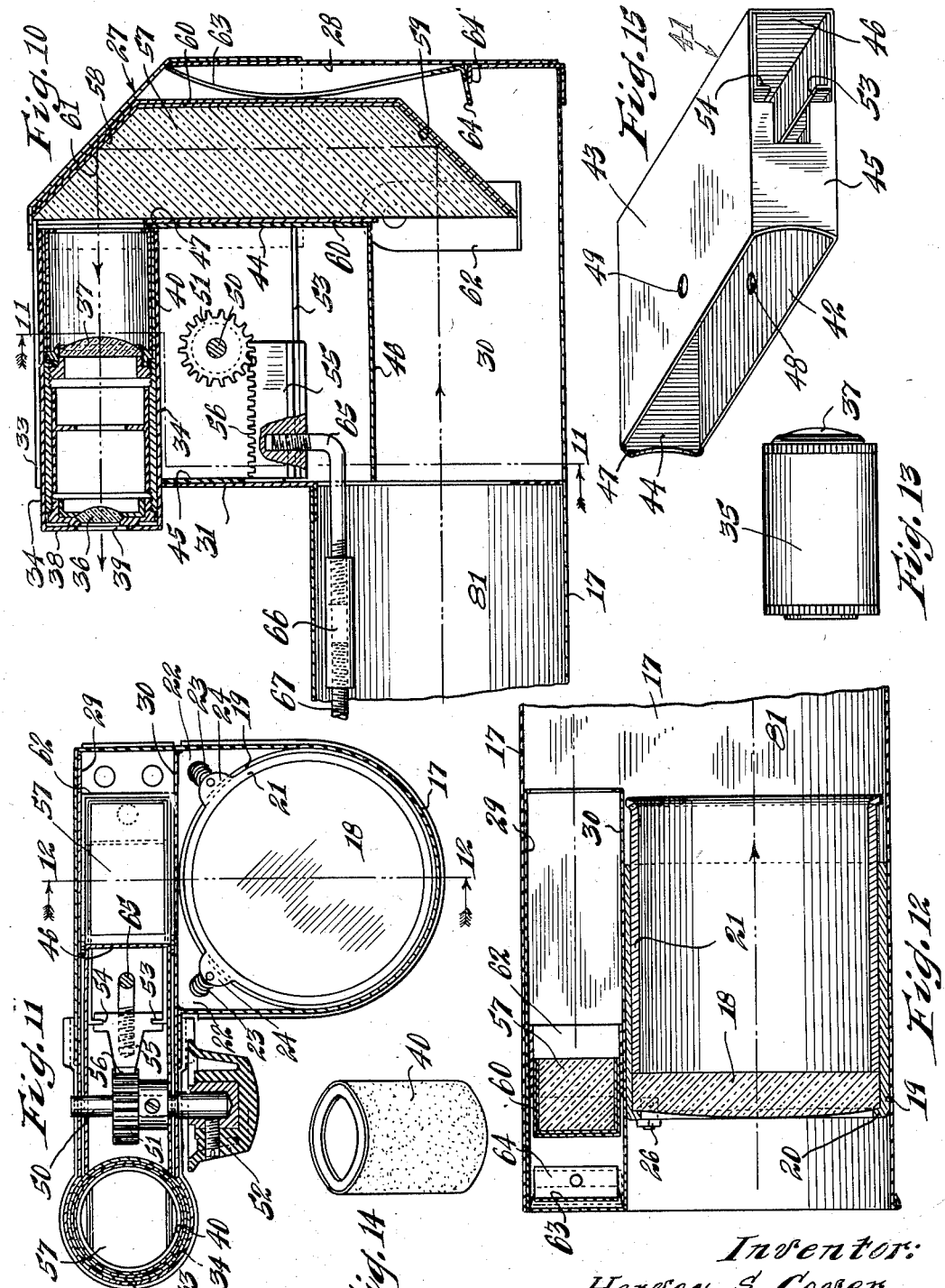

1,978,013

UNITED STATES PATENT OFFICE 1,978,013

PRISM TELESCOPE

Harvey S. Cover, South Bend, Ind.

Application December 27, 1930, Serial No. 505,145

8 Claims. (Cl. 88—33)

This invention relates to a prism telescope, and an object of the invention is the provision of an improved instrument of this character which is simple and durable in construction, highly efficient in operation, economical to manufacture, and embodying novel and advantageous features. A further object is the provision of improved means for mounting the objective lens in the telescope, eliminating the employment of threaded holding and supporting members, reducing the size and also the cost of manufacture of the objective lens mounting.

An additional object is the provision of improved means for supporting and protecting the ocular lens or eye piece. As a further object, the invention provides improved retaining and aligning mechanism for the forward reflecting prism, and improved means for selectively adjusting or positioning the rear reflecting prism.

An additional object is to equip an instrument of the character described with a practical, convenient, and economical supporting and transporting harness for carrying the instrument when not in use.

A further object is the provision in an instrument of this character of a bright or polished interior surface which produces the result of improving the efficiency by rendering the image brighter and more clearly defined.

Other objects will appear hereinafter.

The invention consists in the combinations and arrangements of parts hereinafter described and claimed.

The invention will be best understood by reference to the accompanying drawings forming a part of this specification, and in which:

Fig. 1 is a plan view of the preferred embodiment of the invention as disclosed, with the supporting and transporting harness attached;

Fig. 2 is an enlarged transverse section taken substantially on the line 2—2 of Fig. 1;

Fig. 3 is a perspective view of the flexible supporting collar attachable to the forward end of the instrument;

Fig. 4 is a plan view of the improved objective lens holder and support;

Fig. 5 is an end view of the device shown in Fig. 4, taken from the right;

Fig. 6 is a side view of the instrument with the forward carrying collar removed;

Fig. 7 is a plan view of the instrument as shown in Fig. 6, partly in section and partly broken away;

Fig. 8 is an enlarged sectional view, taken substantially on the line 8—8 of Fig. 7;

Fig. 9 is a transverse sectional taken substantially on the line 9—9 of Fig. 8;

Fig. 10 is an enlarged sectional view taken substantially on the line 10—10 of Fig. 6;

Fig. 11 is a transverse sectional view taken substantially on the line 11—11 of Fig. 10;

Fig. 12 is a sectional view taken substantially on the line 12—12 of Fig. 11;

Fig. 13 is a side elevational view of the ocular lens preferably employed;

Fig. 14 is a perspective view of the ocular lens retaining member; and

Fig. 15 is a perspective view of the operating mechanism supporting frame.

As illustrated in the drawings, the preferred embodiment of the instrument of the invention comprises a main elongated tubular member or barrel 17 which is of uniform cross-sectional outline, and which, as shown in Figs. 2 and 9, is partially circular and partially rectangular. An objective lens 18 is adapted to be mounted adjacent the forward extremity of the instrument, and is mounted in an improved lens holder especially designed to reduce space and the number of parts, as well as lend to the simplicity and also the efficiency of the instrument. This holder preferably comprises an outer tubular support 19, preferably cylindrical in formation, and having an inturned relatively narrow flange 20 provided on the forward extremity adapted to contact with the peripheral edge of the forward surface of lens 18.

An inner confining member in the form of a cylindrical tube 21 is constructed to make a close sliding fit within the tubular support 19, with the forward edge in abutting contact with the rear face of the lens 18 as shown in Fig. 12. Referring to Figs. 4 and 5, the forward portion of the support 19 is provided with integrally formed lateral leg portions 22, and the inner tube 21 is normally urged against the lens 18 by means of tension springs 23 secured to ears 24 on the inner member 21, and at the opposite ends secured to small plates 25 integral with threaded shanks which extend through the legs 22 and are held in place by nuts 26. Thus, objective lens 18 is firmly held in place and engaged by the inner and outer cylinders forming the holder. One result of the construction and arrangement is to materially reduce the cross-sectional area of the holder externally of the lens as particularly shown in Fig. 12.

The forward ocular lens, the forward total reflecting prism, and the focusing mechanism are preferably assembled and mounted in a detachable housing 27 having an end wall 28, side walls 29 and 30, and rearward wall 31. The housing 27 is adapted to be received in the forward portion of barrel 17, and is maintained in position by frictional contact. The main tubular member 17, the housing 27, and the objective lens holder described, are preferably composed of a light, durable, and strong metal such as aluminum, although it will be understood that equivalent material may be employed if preferred. The lateral portion of the housing 27 is formed partly cylindrical as at 32, to provide a cylindrical frictional container for the ocular lens holder or mounting. This cylindrical portion 32 is split by a longitudinal slot 33 in order that the portion may exert a spring like action in maintaining the ocular assembly in position.

The ocular assembly preferably comprises an outer holder in the form of a tubular member 34 within which the ocular member 35 (see Fig. 13) is inserted as shown in Fig. 10. The ocular member employed in the present embodiment is a unitary device having an ocular lens 36 and field glass 37 as shown in Fig. 10, both of which are threadedly engaged in the central tubular support as shown. The portion of the tubular member 34 adjacent the lens 36 has an inturned annular flange 38 terminating in a central opening 39 adjacent the ocular lens 36. This arrangement presents a smooth external surface adjacent the eye piece, and also serves to protect the ocular lens from injury. After the ocular member 35 is inserted in the outer tubular holder 34, a relatively short retaining cylinder 40 (see Fig. 14) is inserted in the holder 34 for the purpose of maintaining the member 35 in position. The cylinder 40 is formed to provide relatively tight sliding engagement within the holder 34. By this construction, ocular members of different lengths may be employed inasmuch as variations in the projection of member 34 beyond the wall 31, or projection of the cylinder 40 in the member 34, are immaterial and do not affect the use or operation of the instrument.

A rack and pinion frame 41 (see Fig. 15) is preferably formed of side walls 42 and 43, end walls 44 and 45, and a bottom wall 46. This frame is adapted to be inserted between walls 29 and 30 of the housing 27, and frictionally held in position. A stop 47 projects above the wall 44 to serve as an inner abutment for the extremity of member 34 or retaining cylinder 40, as the case may be. The walls 42 and 43 of the frame 41 are provided with openings 48 and 49, respectively, which register with corresponding openings in the opposite walls 29 and 30 of the housing 27, to receive and provide a bearing for operating shaft 50, upon which is mounted a pinion 51, and which also has secured thereto an operating knob 52 mounted exteriorly of the housing 27, as shown in Fig. 11. Extending inwardly from walls 42 and 43 of the frame 41 are guides 53 and 54, respectively, which are adapted to extend within lateral grooves provided on a longitudinally slidable rack block 55 provided with rack teeth 56 arranged to mesh with the teeth on pinion 51.

The forward total reflecting prism 57, having reflecting surfaces 58 and 59, is preferably surfaced with felt 60 or equivalent material, except on exposed surfaces where light rays pass. As shown in Fig. 10, this prism is preferably inserted in the housing 27 with one end in contact with oblique wall 61 of the housing 27, and the opposite end is engaged by a stirrup member 62, the legs of which are pivotally attached to walls 29 and 30 of the housing 27. To insert or withdraw the prism 57, the stirrup member 62 is swung toward the left from the position shown in Fig. 10. One surface of the prism 57 is adapted to bear against wall 44 of the frame 41 as shown in Fig. 10, and the prism is held rigidly in place, but is conveniently removed if desired by means of a leaf spring 63, the convex portion of which is adapted to bear against the surface of prism 57 opposite the surface positioned against the wall 44. The inner extremity of the spring 63 contacts with wall 28 or wall 61 of the housing 27, as shown, and the opposite end is bent to provide a gripping portion 64 by means of which the spring may be manually inserted or withdrawn, and which is normally adapted to bear against abutment 64' formed on the inner surface of wall 28.

An L-shaped rod 65 has one end threaded in the block 55 as shown in Fig. 10, and the opposite end is provided with right hand threads for threaded engagement in one end of turn buckle sleeve 66. The opposite end of sleeve 66 is likewise provided with internal threads for threaded engagement with the left hand threads upon the forward end of rod 67 which, as shown, extends rearwardly and is connected to the rear prism bracket member 68. Bracket member 68 is preferably angular in cross-section and is arranged to occupy an upper corner in the rectangular portion of the main tube 17. The member 68 extends rearwardly in this position for attachment to the rear prism holding frame 69, which is preferably felt surfaced for slidable engagement within the tube 17. The rear total reflecting prism 70 may be retained in position by retaining spring member 71. Mounted upon the frame 69 oppositely to the member 68, is a threaded rod 72 provided with left hand threads for threaded engagement in turn buckle sleeve 73 as shown in Fig. 7, and the opposite end of sleeve 73 is internally threaded to engage the right hand threads on rod 74.

The rearward end of rod 74 adjacent the threaded portion extends parallel to member 68, and has a diagonally extending portion 75 which connects with member or connection 68. By this construction and arrangement, lateral adjustment of the rear prism 70 is provided by turning the sleeve 73 to change or position the front face of the prism for proper reflection of light rays, and extremely delicate adjustment is possible by this mechanism. The rear total reflecting prism 70 has a reflecting surface 76 in longitudinal alignment with the objective lens 18, and also has a reflecting surface 77 in longitudinal alignment with reflecting surface 59 of forward prism 57. Thus, it will be understood that manipulation of the turn buckle sleeve 73 serves to swing the rear prism 70 normally on a vertical axis. This movement need not be great for ordinary adjustment, but is desirable to maintain proper direction and travel of the light rays.

The instrument is constructed to furnish great focal length. For example, with the change in direction of the light rays as disclosed, a focal length of fifty inches may readily be obtained. For this reason the tubular portion 17 of the instrument extends rearwardly of the head of the user a considerable distance, and it will be noted that both the ocular lens and the objective lens are located adjacent each other in the forward portion of the instrument. It is desirable in use to place the rear extremity of the tube 17 against a rigid object such as a wall or tree where feasible, to avoid vibration, and for this purpose the extremity is covered by a frictional and protective member 78, preferably composed of rubber, leather, or similar resilient material. The member 78 may be held in place by screws 79 which extend through member 17 into a wooden block 80.

It has also heretofore been the custom in instruments of this character to coat the inner surface of the light directing tubes a dull black or dark color, but an important feature of the present invention is that the inner surface 81 of the main light directing tube 17 is brightly polished to provide a reflecting surface. The inner surfaces of the objective lens holder members are also brightly polished so that the light rays are surrounded by reflecting surfaces throughout their directional travel through the instrument. It has been found that this character of interior surface increases the visibility and brightness of the image, as well as rendering the image more sharply defined and clear.

A special form of transporting harness is provided, and is constructed to conform to the peculiar shape of the instrument. The harness support is preferably composed of leather except for the metal connecting parts, and the forward portion comprises a flexible collar 82 arranged to transversely encircle the forward housing 27. A second collar portion 83 extends at right angles from the portion 82 as shown in Figs. 1 and 3, and is adapted to extend longitudinally of the instrument between the ocular lens and the objective lens. This collar portion is provided with a free end 84 engageable in buckle 85, and is also provided with a slot 86 through which shaft 50 extends. Collar 82 is provided with a ring 87 engageable by snap buckle 88 provided on the forward extremity of intermediate connecting strap 89, which is adjustable in length by buckle 90.

A collar member 91 encircles the tube 17 at the rear extremity adjacent the frictional cap 78, and is provided with a ring 92 detachably engageable by snap buckle 93 mounted on the rear extremity of carrying strap 89. This arrangement enables the instrument to be carried by hanging strap 89 on either shoulder, although ordinarily the left shoulder is preferable, which permits the instrument to be conveniently raised to the right eye with the tubular portion 17 resting on the right shoulder, which brings the ocular lens 36 in alignment with the right eye. When not in use, the instrument may rest against the back of a user, with the strap 89 extending across the chest.

The operation of the instrument is indicated mainly by the foregoing description. Focal adjustment is made by means of manual rotation of adjusting knob 52, which serves to change the relative position of the rear total reflecting prism 70 through the rack and pinion operating mechanism and connection to the rear prism. The light rays passing through the objective lens 18 are carried rearwardly to reflecting surface 76 of the rear total reflecting prism 70, thence forwardly by reflecting surface 77 to surface 59 of forward prism 57, thence transversely to surface 58, and thence rearwardly through the ocular member. The objective lens holder described is frictionally held in position by contact with the tube 17, and also with the adjacent portion of the housing 27.

While I have illustrated and described the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

What I claim as new and desire to secure by Letters Patent is:

1. An instrument of the character described, comprising a main tubular light directing member arranged to extend rearwardly of the head of the user a substantial distance for support against a rigid object, an objective lens positioned forwardly in said tubular member, an ocular lens positioned forwardly in said tubular member, an integral total reflecting prism positioned rearwardly in said tubular member for receiving light rays from said objective lens and returning said rays forwardly, an integral total reflecting prism positioned forwardly in said tubular member for reflecting said forwardly directed rays to said ocular lens, and means for selectively changing the position of said rear total reflecting prism to alter the angular relationship of the forward face thereof with said objective lens.

2. An instrument of the character described, comprising a main tubular light directing member arranged to extend rearwardly of the head of the user a substantial distance for support against a rigid object, an objective lens positioned forwardly in said tubular member, an ocular lens positioned forwardly in said tubular member, an integral total reflecting prism positioned rearwardly in said tubular member for receiving light rays from said objective lens and returning said rays forwardly, an integral total reflecting prism positioned forwardly in said tubular member for reflecting said forwardly directed rays to said ocular lens, means for selectively changing the position of said rear total reflecting prism to alter the angular relationship of the forward face thereof with said objective lens, and manually operable means connected to said rearwardly mounted prism for focusing purposes.

3. The combination with an instrument of the character described having a main tubular member partially circular and partially rectangular in cross-section, of an objective lens support comprising an outer tubular lens holder having smooth cylindrical outer and iner surfaces and arranged to be frictionally maintained in position in the circular portion of said main tubular member, lateral leg members mounted adjacent one end of said outer holder and arranged to be frictionally maintained in position in the rectangular portion of said main tubular member, an inturned flange upon one end of said outer holder adapted to contact with one surface of a lens, an inner tubular lens holder insertable within said outer holder and adapted to contact with the opposite surface of said lens, and spring means connecting said leg members and said inner holder for maintaining said holders in contact with said lens.

4. The combination with an instrument of the character described having a main tubular member partially circular and partially rectangular in cross-section, of an objective lens support comprising an outer tubular lens holder having smooth cylindrical outer and inner surfaces and arranged to be frictionally maintained in position in the circular portion of said main tubular member, lateral leg members mounted adjacent one end of said outer holder and arranged to be frictionally maintained in position in the rectangular portion of said main tubular member, an inturned flange upon one end of said outer holder adapted to contact with one surface of a lens, an inner tubular lens holder insertable within said outer holder and adapted to contact with the opposite surface of said lens, an ear member mounted upon said inner holder, and a tension spring connecting said ear member and one of said leg members for maintaining said holders in contact with said lens.

5. In an instrument of the character described, the combination of a prism receiving member arranged to support a prism having opposite flat surfaces and opposite diagonal end surfaces, an abutment in said member supporting and covering the middle portion of one of said flat surfaces of the prism, a wall in said member arranged at a corresponding inclination to engage and support one of said diagonal end surfaces of the prism, a resilient detachable member arranged to bear against the opposite flat surface of the prism, and a swingably mounted stirrup member supportingly engageable with the end of the prism opposite to that engaged and supported by said inclined wall portion of the receiving member.

6. In an instrument of the character described, the combination of a lens support, an outer cylindrical lens holder having smooth outer and inner surfaces and adapted to be frictionally maintained in position in said support, a narrow inturned flange provided upon one end of said holder and adapted to contact with one surface of a lens, a pair of lateral leg portions on said holder, an inner confining cylindrical member insertable in said outer holder and adapted to contact with the opposite surface of said lens, and tension spring means connecting said leg portions and said confining member.

7. An instrument of the character described, comprising a main tubular light directing member arranged to extend rearwardly of the head of the user a substantial distance for support against a rigid object, an ocular lens positioned forwardly in said tubular member, the forward portion of said tubular member adapted to serve as an objective lens support, an outer cylindrical lens holder having smooth outer and inner surfaces and adapted to be frictionally maintained in position in said support, an objective lens, a narrow inturned flange provided upon one end of said holder and adapted to contact with one surface of said objective lens, an inner confining cylindrical member insertable in said outer holder and adapted to contact with the opposite surface of said objective lens, tension spring means connecting said outer holder and said confining member, a total reflecting prism positioned rearwardly in said tubular member for receiving light rays from said objective lens and returning said rays forwardly, a total reflecting prism positioned forwardly in said tubular member for reflecting said forwardly directed rays to said ocular lens, and a frictional contacting member mounted upon the rear extremity of said main tubular member.

8. An instrument of the character described, comprising a main tubular light directing member arranged to extend rearwardly of the head of the user a substantial distance for support against a rigid object, an ocular lens positioned forwardly in said tubular member, the forward portion of said tubular member adapted to serve as an objective lens support, an outer cylindrical lens holder having smooth outer and inner surfaces and adapted to be frictionally maintained in position in said support, an objective lens, a narrow inturned flange provided upon one end of said holder and adapted to contact with one surface of said objective lens, an inner confining cylindrical member insertable in said outer holder and adapted to contact with the opposite surface of said objective lens, tension spring means connecting said outer holder and said confining member, a total reflecting prism positioned rearwardly in said tubular member for receiving light rays from said objective lens and returning said rays forwardly, a total reflecting prism positioned forwardly in said tubular member for reflecting said forwardly directed rays to said ocular lens, and a frictional contacting member mounted upon the rear extremity of said main tubular member, said main tubular member and said inner cylindrical member having brightly polished reflecting surfaces on the interior.

HARVEY S. COVER.